United States Patent
Andre et al.

(10) Patent No.: US 7,637,562 B2
(45) Date of Patent: Dec. 29, 2009

(54) MOTOR VEHICLE PART INCLUDING LIGHT UNIT SUPPORT MEANS

(75) Inventors: Gerald Andre, Amberieu En Bugey (FR); Arnold Fayt, Jujurieux (FR); Laurent Rocheblave, Villeurbanne (FR)

(73) Assignee: Compagnie Plastic Omnium, Lyons (FR)

( * ) Notice: Subject to any disclaimer, the term of this patent is extended or adjusted under 35 U.S.C. 154(b) by 401 days.

(21) Appl. No.: 11/604,734

(22) Filed: Nov. 28, 2006

(65) Prior Publication Data

US 2007/0120420 A1 May 31, 2007

(30) Foreign Application Priority Data

Nov. 28, 2005 (FR) .................................. 05 12034

(51) Int. Cl.
*B60N 99/00* (2006.01)
(52) U.S. Cl. .............................. 296/193.09; 296/203.02
(58) Field of Classification Search ............ 296/187.09, 296/193.09, 203.02
See application file for complete search history.

(56) References Cited

U.S. PATENT DOCUMENTS

| | | | | |
|---|---|---|---|---|
| 2,662,794 A | * | 12/1953 | Lindsay ................. | 296/193.01 |
| 3,819,224 A | * | 6/1974 | Casey et al. ............ | 296/187.09 |
| 6,880,883 B2 | * | 4/2005 | Decker et al. .......... | 296/203.02 |
| 7,066,533 B2 | * | 6/2006 | Sohmshetty et al. ... | 296/203.02 |
| 7,267,394 B1 | * | 9/2007 | Mouch et al. .......... | 296/203.02 |
| 7,341,299 B1 | * | 3/2008 | Baccouche et al. ............ | 296/30 |
| 2002/0051366 A1 | | 5/2002 | Oh | |
| 2003/0099110 A1 | | 5/2003 | Brown et al. | |
| 2004/0057249 A1 | | 3/2004 | Arlon | |
| 2005/0269838 A1 | * | 12/2005 | Sohmshetty et al. ... | 296/203.02 |

FOREIGN PATENT DOCUMENTS

| | | |
|---|---|---|
| DE | 199 59 892 A1 | 6/2001 |
| DE | 101 49 120 C1 | 4/2003 |
| DE | 103 47 810 A1 | 5/2005 |
| DE | 103 52 310 A1 | 6/2005 |
| EP | 1 203 693 A2 | 5/2002 |
| EP | 1 577 610 B1 | 9/2005 |
| FR | 2 884 758 | 3/2004 |
| FR | 2 855 810 | 12/2004 |
| JP | A 2001-310767 | 11/2001 |

* cited by examiner

*Primary Examiner*—Lori L Lyjak
(74) *Attorney, Agent, or Firm*—Oliff & Berridge, PLC

(57) ABSTRACT

The invention relates to a motor vehicle part including a light unit support possessing an initial "operational" position in which the light unit is held at a given height on the vehicle. The light unit support also is configured to take up a second "depressed" configuration on being subjected to a vertical force that is substantially equal to that of an impact with the head of a pedestrian, in which second configuration the light unit is located lower down relative to the vehicle.

25 Claims, 3 Drawing Sheets

MOTOR VEHICLE PART INCLUDING LIGHT UNIT SUPPORT MEANS

BACKGROUND

1. Field of Invention

The present invention relates to a motor vehicle part including light unit support means.

2. Description of Related Art

In the state of the art, in particular from EP 1 577 610, a light unit is already known that is arranged on a vehicle in such a manner as to damp impacts of medium intensity with other vehicles (known as "insurance" or "repairable" impacts), or else with the hip of a pedestrian, where such impacts are directed mainly in the travel direction of the vehicle (generally referred to as the X direction). That light unit is provided with fastenings that break on being subjected to high levels of stress in the X direction, thereby allowing the light unit to move backwards. Thus, the light unit is not damaged by the impact and can easily be repaired. In addition, it does not constitute a dangerous "hard" point in the event of an impact with the hip of a pedestrian.

It is also known that attempts are being made to protect the heads of pedestrians in the event of an impact with the zone covering the front fender and the light unit, referred to as the "head" zone. For this purpose, it is desired to provide a zone that becomes depressed in the vertical direction (generally referred to as the Z direction) that does not have a hard point so as to allow a head to move down over a certain distance during an impact.

The state of the art already discloses a fender support capable of damping such an impact, known as a "head impact", as described in particular in publications FR 2 855 810 or DE 10 347 810.

SUMMARY

The problem lies in there being no known way of dealing with a head impact against a vehicle in which the fender covers the light unit. The light unit constitutes a hard point, such that even if the fender can become depressed by using the prior art support, the light unit remains dangerous for the head of a pedestrian.

The present invention seeks to provide a part for supporting a light unit and that is capable of dealing with a head impact, regardless of the configuration of the front of the vehicle.

To this end, the invention provides a motor vehicle part including means for supporting a light unit, these light unit support means possessing an initial, so-called "operating" configuration in which the light unit is held at a given height on the vehicle, the part being characterized in that the light unit support means are also capable of taking up a second, so-called "depressed" configuration on being subjected to a vertical force substantially equal to that of an impact with the head of a pedestrian, in which second configuration the light unit is lower down relative to the vehicle.

The invention provides a support part that acts as a support for the light unit when in its operating configuration, while nevertheless also protecting a pedestrian by moving down over a certain distance under drive from the head of the pedestrian. The light unit thus no longer constitutes a dangerous hard point.

The term "vertical force" is used to mean a force directed in the direction that is conventionally vertical relative to the vehicle, referred to as the Z direction. The value of this force in accordance with the invention, which is substantially equal to the force of an impact against the head of a pedestrian, lies in the range 250 kilograms (kg) to 900 kg, and preferably in the range 300 kg to 600 kg. Advantageously, the support means also take up a depressed configuration under the effect of a force that is vertical in part only, i.e. a force that comprises not only a component in the vertical direction, but also a component in the longitudinal direction of the vehicle, referred to as the X direction, and/or in the transverse direction, referred to as the Y direction. Such a part is thus capable of handling not only a head impact, but also a "hip" impact.

The term "light unit support means" is used to cover means capable of supporting the light unit, at least in part. In general, the light unit is supported via three or four points. The second configuration of the support means may be the result of one or two of these points rupturing, and of rotation alone about the other points. It may also result from all of the points.

The term "light unit" covers an assembly comprising optical glazing, a housing, and optical and lighting components. For simplification purposes, the term "light unit" may designate one or another of the above parts or the assembly thereof.

In a preferred embodiment, the part further includes means for supporting a fender of the vehicle, said means possessing an initial, operating configuration in which the fender is held at a given altitude, and also being capable of taking up a second, depressed configuration on being subjected to a vertical force substantially equal to that from an impact with the head of a pedestrian, in which second configuration the fender occupies a lower position.

Thus, in the event of a head impact, the fender support means no longer constitute a hard point for the pedestrian. This embodiment is particularly advantageous for vehicles where the fender covers the light unit. Furthermore, instead of using two distinct support parts for the light unit and for the fender, each of which is provided with its own means for fastening to the structure of the vehicle, a common part is used for performing support functions both for the light unit and for the fender, such that the configuration of the front unit of the vehicle is simplified, in particular because the means for fastening to the structure are common.

Preferably, the part is provided with fusible means arranged to hold the means for supporting the light unit and/or the fender in their operating configuration. These means are fusible in the vertical direction, i.e. they are capable of breaking or of deactivating under the effect of a vertical force, and thus of enabling the support means for the light unit and/or the fender to take up their depressed configuration.

Advantageously, the fusible means are means that are deformable in buckling or in folding, or means that break in shear.

Preferably, the fusible means are constituted by means for fastening the part to a structural part of the vehicle.

The term "structural part of the vehicle" is used to mean a rigid part belonging to the chassis or the body-in-white of the vehicle, such as a low or high longitudinal member, a cross-member, or an upright of a front panel, a strut of the body carrying hinges for a vehicle door or for a hood, a frame member around a recess, a structural wheel arch, etc.

Preferably, the part further includes means for positioning the light unit or a member supporting the light unit, means for positioning the fender, means for positioning a bumper skin, and/or also means for positioning a hood. Thus, in addition to its semi-structural function, the part performs a function of putting various bodywork parts into reference positions relative to one another, said parts being situated specifically in a zone that requires particular attention from the point of view of making parts flush and putting them properly into position.

It is particularly advantageous for the part to include in particular means for positioning two adjacent bodywork parts relative to each other, since said means serve to act directly on the two facing edges that are to be positioned so as to position those edges relative to each other. The support can thus be provided with direct-thrust positioning means for the fender and for the light unit so as to provide control over positioning between the top edge of the light unit glazing and the edge of the fender that is best in terms of clearance and surfaces that are flush.

Preferably, the part also provides an anti-indentation function for the fender. For example, it matches substantially the inside shape of the fender, thus making it possible to use a fender that is relatively flexible and thin, e.g. made of plastics material, of aluminum, or of steel, and without it being necessary to apply reinforcement in the fender.

Advantageously, the part is adapted to support the fender during a step during which the vehicle is painted or subjected to cataphoresis, thus enabling the part to be mounted on the vehicle before the fender is mounted, and then enabling it to support the fender during subsequent assembly steps.

A part of the invention may also present one or more of the following characteristics:

- The part includes means for fastening to two structural parts of the vehicle, namely a front vertical upright and a side rail of the bodywork.
- The means for supporting the light unit and/or the fender are arranged in such a manner as to conserve their operating configuration(s) under the effect of a force substantially equal to that of the weight of a sitting person or to vibration during operation of the vehicle. In other words, the fusible means are strong enough to support some minimum force, e.g. 50 kilograms weight (kg), imparting the stiffness needed to enable the part to operate, while being capable of breaking or of being deactivated under the effect of a force exceeding a certain threshold.
- The means for supporting the light unit and/or the fender are capable of taking up two depressed configurations, depending on whether they are subjected to a vertical force equal to that of an impact with the head of a pedestrian of adult size or of child size.
- The part extends over the major fraction of a so-called pedestrian head impact zone, constituted by top portions of the fender and of light unit.
- The part is shaped so as to free access to the light unit in order to change a bulb.
- The part includes adjustable fastener means for the light unit, so as to enable the light unit (or at least its glazing or its housing) to be positioned relative to the remainder of the vehicle prior to being secured finally in place for operation on the vehicle.
- The part includes hood abutments.
- The part is made of a thermoplastic material of the polyamide type that can withstand 200° C., and possibly associated with metal reinforcement by overmolding. Alternatively, it is made of a thermosetting resin of the sheet molding compound (SMC) type, or of the type sold under the trademark AMC 3600 (adapted molding compound).

The invention also provides an assembly comprising a light unit and a part as defined above, in which the part is made integrally with the housing of the light unit.

Optionally, the means for supporting the fender are formed on the light unit.

BRIEF DESCRIPTION OF THE DRAWINGS

The invention can be better understood on reading the following description given purely by way of example and made with reference to the accompanying drawings, in which.

DETAILED DESCRIPTION OF EMBODIMENTS

Figure 1:
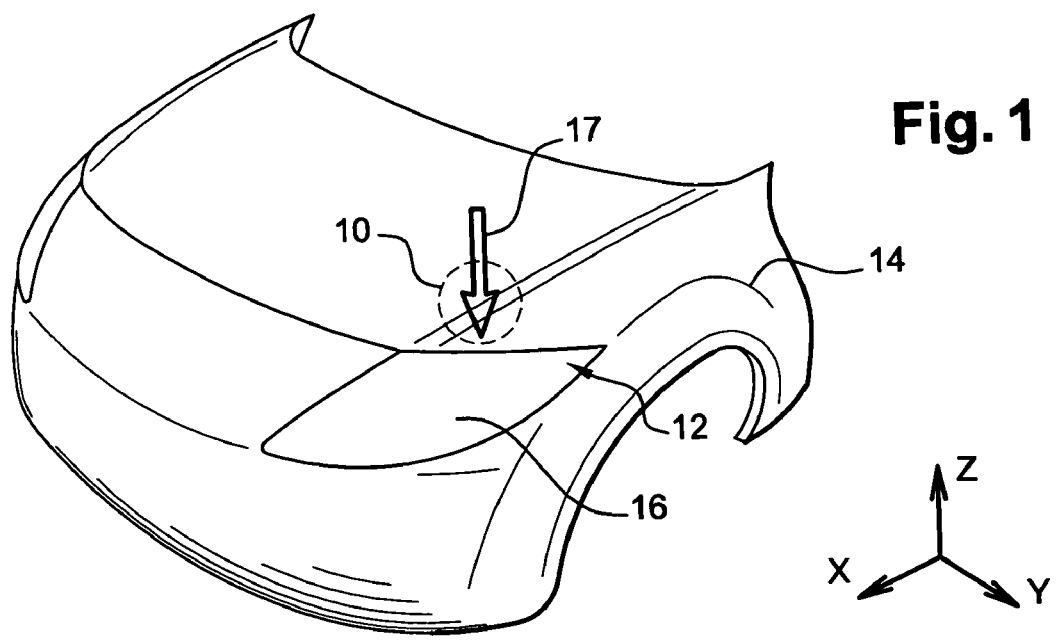
FIG. 1 is a diagram of a motor vehicle front.

A part of the invention serves to protect a pedestrian who has been hit by a vehicle and whose head 10 is liable to strike a zone 12 of a motor vehicle front that is referred to as the "head" zone, as shown in FIG. 1.

In the event of an impact, the zone 12 is subjected to a force that is essentially vertical, represented by arrow 17 and directed along the Z direction. This force may also have components in the X and Y directions, i.e. it might be directed obliquely relative to the vehicle.

The zone is constituted by the top portion of a fender 14 that covers a light unit 16. While the vehicle is in operation, the fender 14 and the light unit 16 are maintained at a given height on the vehicle, referred to as the operating height, i.e. the height as shown in FIG. 1.

Figure 2:
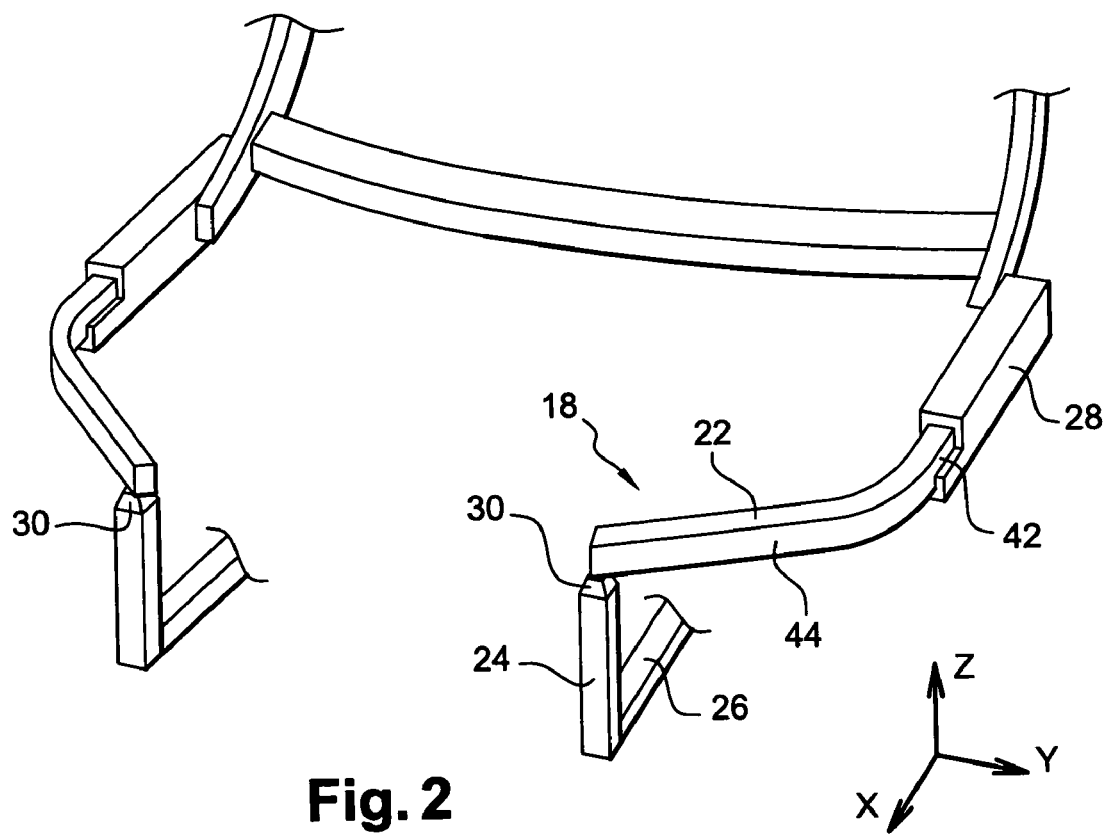
FIG. 2 is a diagram of a vehicle front structural portion including a part constituting a first embodiment of the invention.

The light unit is supported by a semi-structural part 18 of the invention shown in FIG. 2, constituting a support for the light unit 16 and the fender 14 (not shown).

The unit 16 may optionally be supported by the part 18 via a support member that is secured to the part 18. When suitably positioned relative to the other parts of the bodywork, this support member (not shown) serves to enable the light unit to be put into place and removed without it being necessary for it to be re-positioned.

The part 18 also constitutes a support for the front fender 14 of the vehicle. More particularly, it includes fender support means 22 that are constituted by the top portion of the part 18.

The part 18 is secured to two structural parts of the vehicle, namely a front vertical upright 24 secured to a longitudinal member 26, and a side rail 28 of the body.

The part 18 is secured to the upright 24 by fusible means 30. These means 30 are arranged to hold the part 18 in an initial, operating configuration in which the light unit 16 and the fender 14 are held at their operating heights.

Figure 3:
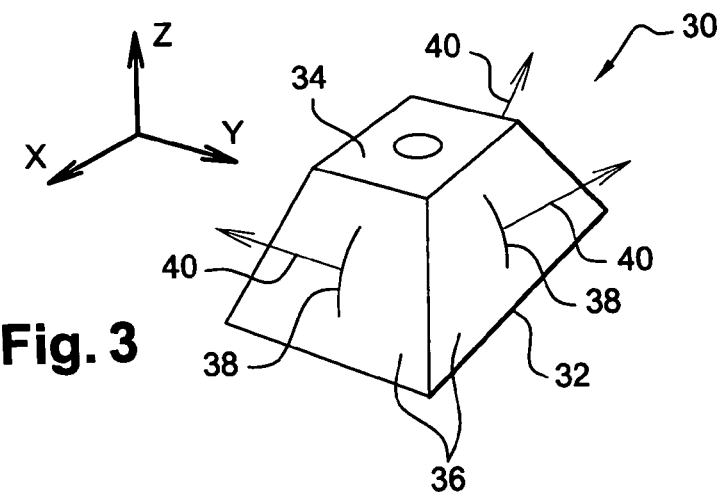
FIG. 3 is a diagram showing fusible means formed on the part of FIG. 2.

These means 30 may be constituted by a stud, as shown in FIG. 3, that is hollow and in the form of a pyramid of square base 32 and top 34, with side surfaces 36 that are pre-slit. By means of these slits 38, the surfaces 36 can buckle in the directions represented by arrows 40 in the event of the stud being subjected to a certain amount of vertical force in the Z direction.

In the event of a head impact, the zone 12, and consequently the stud 30, are both subjected to a force that is sufficient to cause the walls 36 to buckle. The height of the stud decreases, thereby lowering the part 18 that is secured to its top 34, so that the part 18 then occupies a depressed configuration in which the heights of the light unit 16 and of the fender 14 are lower than their operating heights. This difference in height increases the distance over which energy can be absorbed prior to striking a structural part of the vehicle.

Figure 8:
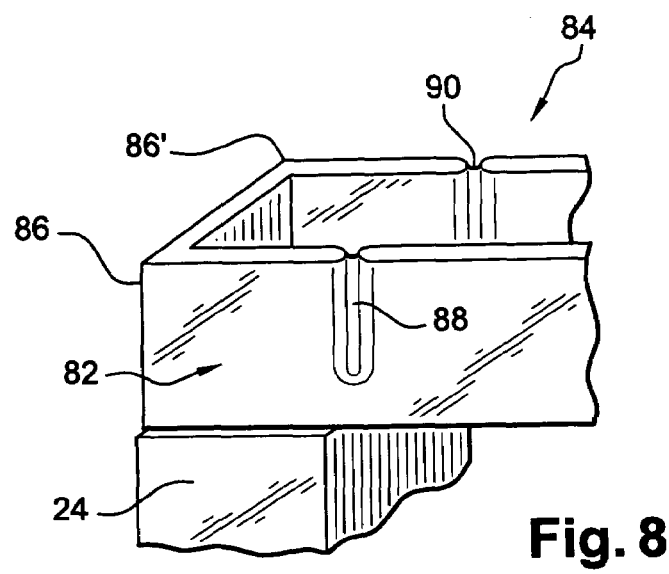
FIG. 8 is a perspective diagram of fusible means arranged on a part of the invention.

In a variant shown in FIG. 8, the part 18 comprises a bottom portion 84 secured to the upright 24 in a contact zone 82. The bottom portion 84 is a channel-section bar, having two side flanges 86 and 86'.

In this configuration, the means 30 comprise constrictions in thickness 88 in the side flanges 86 and 86' associated with notches 90 at the top ends of each of the constrictions. These fusible means 30 are situated in a so-called zone of "weakness" formed at the periphery of the contact zone 82.

In the event of a head impact, the part 18 is subjected essentially to a downwardly-directed vertical force. The forces then concentrate in the zone of "weakness" at the periphery of the contact zone 82, which contact zone is held rigidly in place on the upright 24.

The force to which the side flanges 86 and 86' are subjected in the region of the constriction 88 in thickness is sufficient for a break starter to be created by shear in the vicinity of the notch 90. This causes the bottom portion 84 to break in the zone of weakness, and thus reduces the height of the light unit 16, since it is no longer supported by the upright 24 and thus by the body.

Fusible means other than those described could be envisaged. For example, a part arranged in a "concertina" configuration in the Z direction could be provided between the part 18 and the upright 24, so as to be capable of reducing its height under the action of a vertical force.

Figure 4:
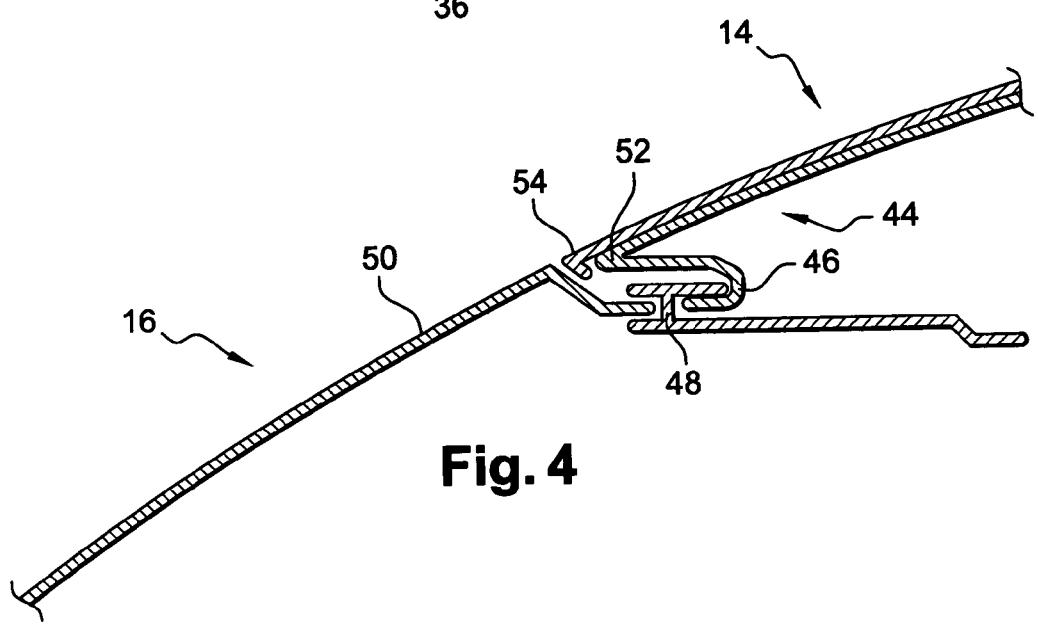
FIG. 4 is a section view of the FIG. 2 part, supporting a light unit and a fender.

Fusible means 42 may also be provided on the other end of the part 18 that is secured to the side rail 28;

The part 18 also carries means 44 for directly positioning the light unit 16 and the fender 14, as can be seen more precisely in FIG. 4.

These positioning means 44 comprise a groove 46 enabling a portion 48 of the light unit housing that is situated in the vicinity of the optical glazing 50 to be positioned. In the vicinity of the groove 46, the means 44 comprises a rib 52 receiving the top edge 54 of the fender. As can be seen in the figure, the top edge 54 of the fender and that of the glazing 50 are correctly positioned flush with minimum clearance, by the means 44.

Figure 5:
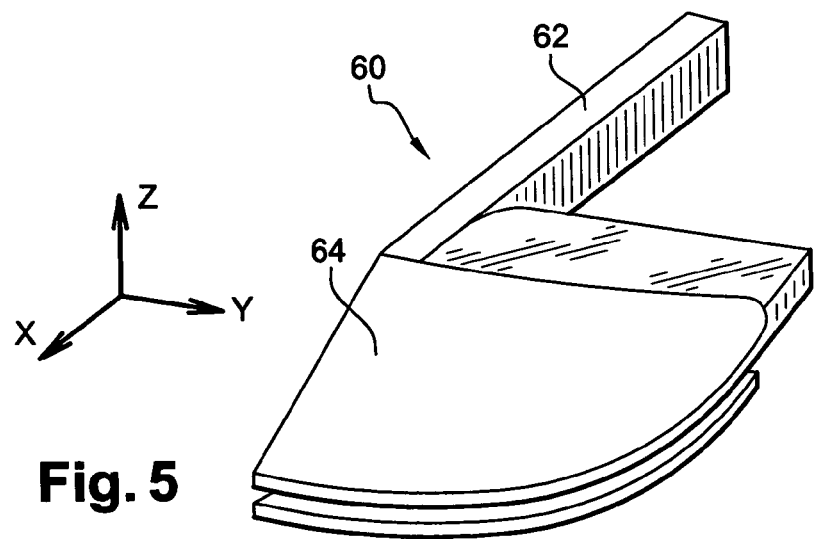
FIG. 5 is a perspective diagram of a part constituting a second embodiment of the invention.

In another embodiment shown in FIG. 5, a part 60 of the invention is constituted by a strip 62 along which there is secured the top edge of the fender. The light unit 64 is also secured to the strip 62. It may be molded integrally with the strip 62. Nevertheless, it is preferable to provide adjustable fastenings between the light unit and the strip 62 so as to enable the light unit to be positioned on the vehicle prior to finally setting its operating height.

The part 60 constitutes a support for the light unit 64 and for the fender. It matches substantially the inside top shape of the fender, so as to perform an anti-indentation function.

It may take up a depressed configuration when subjected to a vertical force equal to that of an impact with the head of a pedestrian. In such a configuration, the light unit and the fender are to be found at a lower height.

Figure 7:
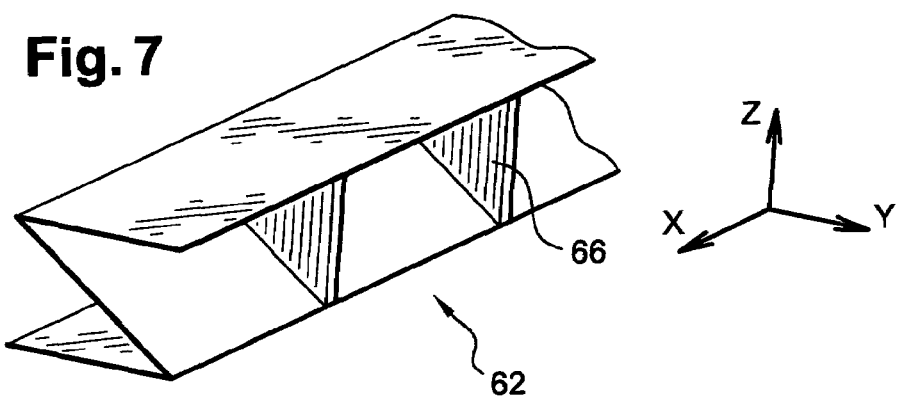
FIG. 7 is a diagram of fusible means suitable for being formed on a part of the invention.

This depressed configuration is obtained by virtue of fusible means provided by the shape of the strip 62 which is constituted by a hollow tube that is capable of deforming by buckling. The strip 62 may also be Z-shaped, as shown diagrammatically in FIG. 7, and it may be provided with gussets 66 capable of buckling under the action of a vertical force.

Figure 6:
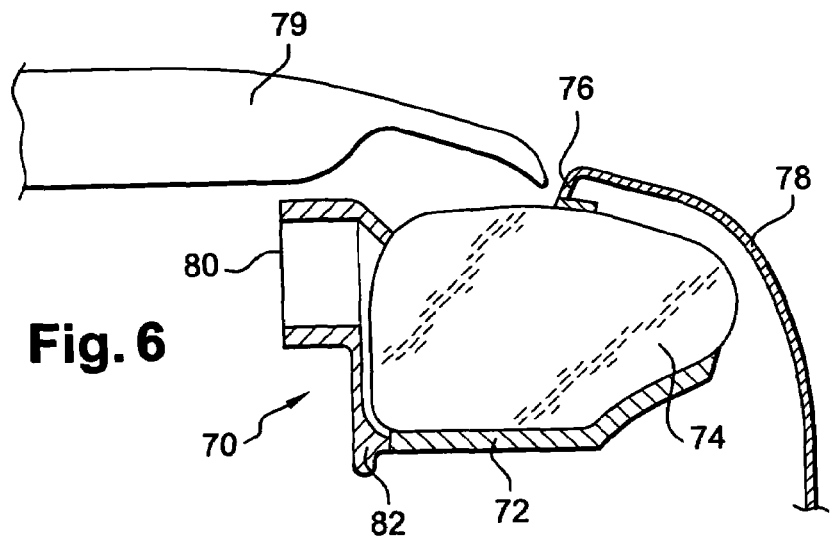
FIG. 6 is a diagram of a part constituting a third embodiment of the invention.

In another embodiment of the invention shown in FIG. 6, a part 70 of the invention includes means 72 for supporting the light unit 74, which in turn carries means 76 for supporting the fender 78. The light unit 74 is covered in part by the hood 79 of the vehicle. A portion 80 of the part 70 is fusible in the event of a head impact. If the impact takes place more particularly on the outer portion of the fender, the portion 80 becomes pushed in, such that the outer portion of the light unit 74 can pivot relative to a portion 82 of the part 70 and thus move downwards.

In a second embodiment shown in FIG. 8, the part 18 is of a shape similar to that of the part shown in FIG. 2, and it is placed in the motor vehicle in the same manner. The part 18 includes a bottom portion 84 that is in contact with the upright 24 in a contact zone 82 that is situated in the bottom portion 84 of the part 18, with the upright 24. The bottom portion 84 is a channel-section member with two side flanges 86 and 86'.

In this embodiment, the means 30 comprise a constriction 88 in the thickness of each of the side flanges 86 and 86', together with associated notches 90 at the top edges of the flanges in the contact 82. These fusible means 30 are situated in a so-called zone of "weakness" situated at the periphery of the contact zone 82.

In the event of a head impact, the part 18 is subjected to a downwardly-directed vertical force. Forces then become concentrated at the periphery of the contact zone 82 since it is held rigidly by the upright 24.

The shear force to which the side flanges 84 and 86 are subjected in the vicinity of the constrictions 88 in thickness in this location is sufficient to create a rupture starter in the vicinity of the notches 90. This causes the bottom portion 84 to rupture in the zone of weakness, thereby causing the light unit to move downwards, since it is no longer supported by the body via the upright.

Finally, it should be observed that the invention is not limited to the embodiments described above.

The invention claimed is:

1. A motor vehicle part comprising:
    a light unit support that supports a light unit of a vehicle, the light unit support possessing an initial, operating configuration in which the light unit is held at a given height on the vehicle, the light unit support being configured to take up a second depressed configuration on being subjected to a vertical force in the range of 250 kg to 900 kg, which is substantially equal to that of an impact with the head of a pedestrian, in which the second depressed configuration of the light unit support is lower relative to the vehicle; and
    a fender support that supports a fender of the vehicle, said fender support possessing an initial, operating configuration in which the fender is held at a given altitude on the vehicle, and also being configured to take up a second depressed configuration on being subjected to the vertical force, in which the second configuration of the fender support occupies a lower position relative to the vehicle.

2. The motor vehicle part according to claim 1, further including fusible means for holding at least one of the light unit support and the fender support in an operating configuration.

3. The motor vehicle part according to claim 2, wherein the fusible means are configured to buckle or fold when subjected to the vertical force.

4. The motor vehicle part according to claim 2, wherein the fusible means are adapted to break in shear when subjected to the vertical force.

5. The motor vehicle part according to claim 2, wherein the fusible means fasten the motor vehicle part to a structural part of the vehicle, including one of a front vertical upright and a side rail of the vehicle.

6. The motor vehicle part according to claim 1, wherein the light unit support includes means for positioning the light unit.

7. The motor vehicle part according to claim 1, wherein the fender support includes means for positioning the fender.

8. The motor vehicle part according to claim 1, wherein at least one of the light unit support and the fender support includes means for positioning a bumper skin.

9. The motor vehicle part according to claim 1, wherein at least one of the light unit support and the fender support includes means for positioning a hood.

10. The motor vehicle part according to claim 1, wherein at least one of the light unit support and the fender support includes means for positioning two adjacent bodywork pieces relative to each other.

11. The motor vehicle part according to claim 1, wherein the fender support has an anti-indentation function for the fender.

12. The motor vehicle part according to claim 2, wherein the fender support is adapted to support the fender during vehicle to painting or cataphoresis.

13. The motor vehicle part according to claim 1, wherein at least one of the light unit support and the fender support is arranged to maintain the operating configuration under the effect of a force of about 50 kg or to vibration during operation of the vehicle.

14. The motor vehicle part according to claim 1, wherein at least one of the light unit support and the fender support is configured to take up two depressed configurations, depending on the magnitude of the vertical force.

15. The motor vehicle part according to claim 1, wherein the motor vehicle part extends over a major fraction of a pedestrian head impact zone.

16. The motor vehicle part according to claim 1, wherein the motor vehicle part is shaped to provide free access to the light unit in order to change a bulb.

17. The motor vehicle part according to claim 1, further comprising an adjustable fastener that fastens to the light unit.

18. The motor vehicle part according to claim 1, further comprising hood abutments.

19. The motor vehicle part according to claim 1, wherein at least one of the light unit support and the fender support also is configured to take up the depressed configuration under the effect of a force that is vertical in part only.

20. The motor vehicle part according to claim 1, wherein the motor vehicle part is made of thermoplastic material.

21. The motor vehicle part according to claim 1, wherein the motor vehicle part is made of sheet metal compound thermosetting resin.

22. An assembly comprising a light unit and the motor vehicle part according to claim 1, wherein the motor vehicle part is made integrally with the light unit.

23. An assembly comprising a light unit and the motor vehicle part according to claim 2, wherein the fender support is formed on the light unit.

24. The motor vehicle part according to claim 1, wherein the vertical force at which the light unit support and the fender support take up the second depressed position is in the range of 300 kg to 600 kg.

25. The motor vehicle part according to claim 20, wherein the thermoplastic material includes metal reinforcement.

* * * * *